Patented Oct. 15, 1946

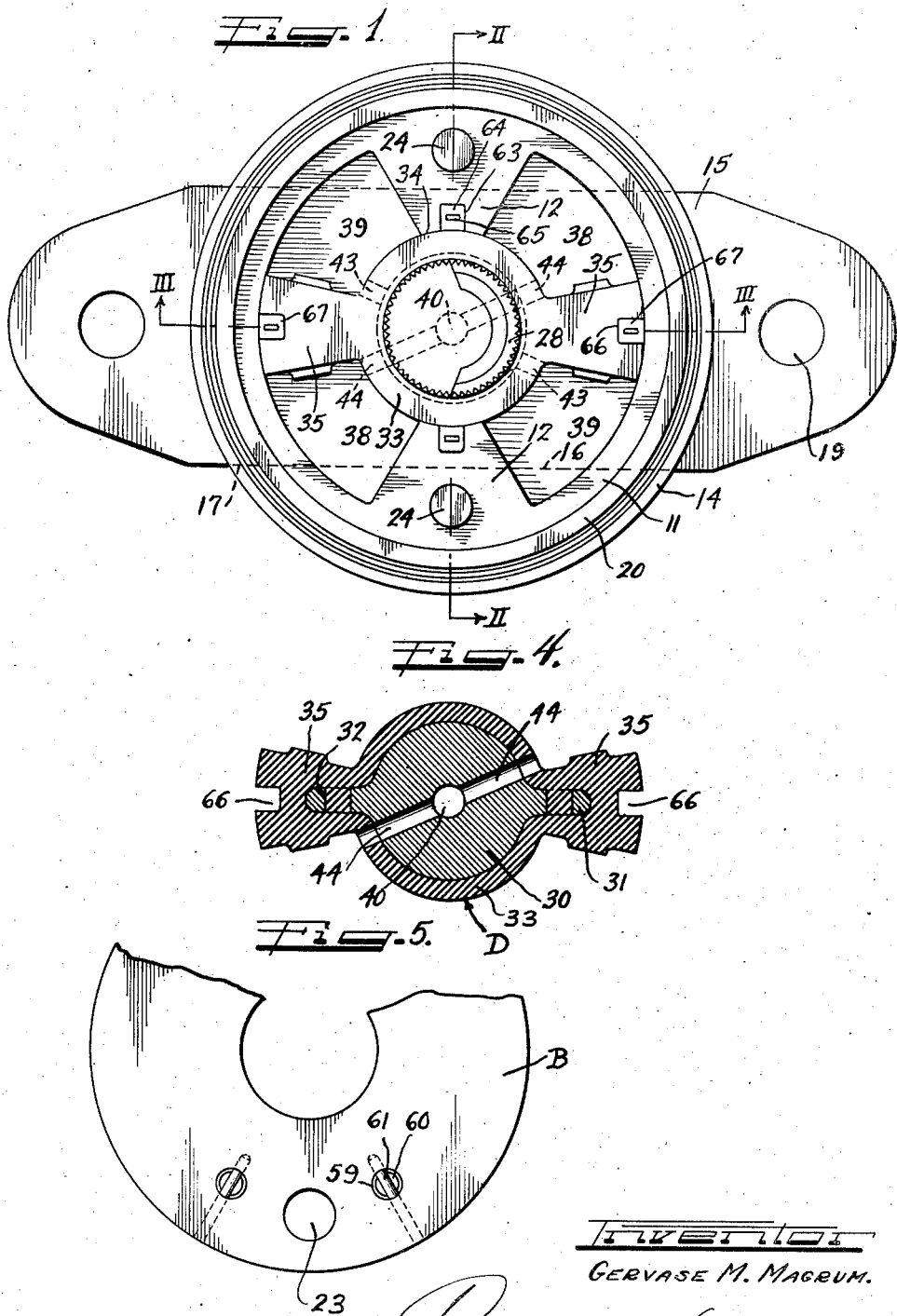

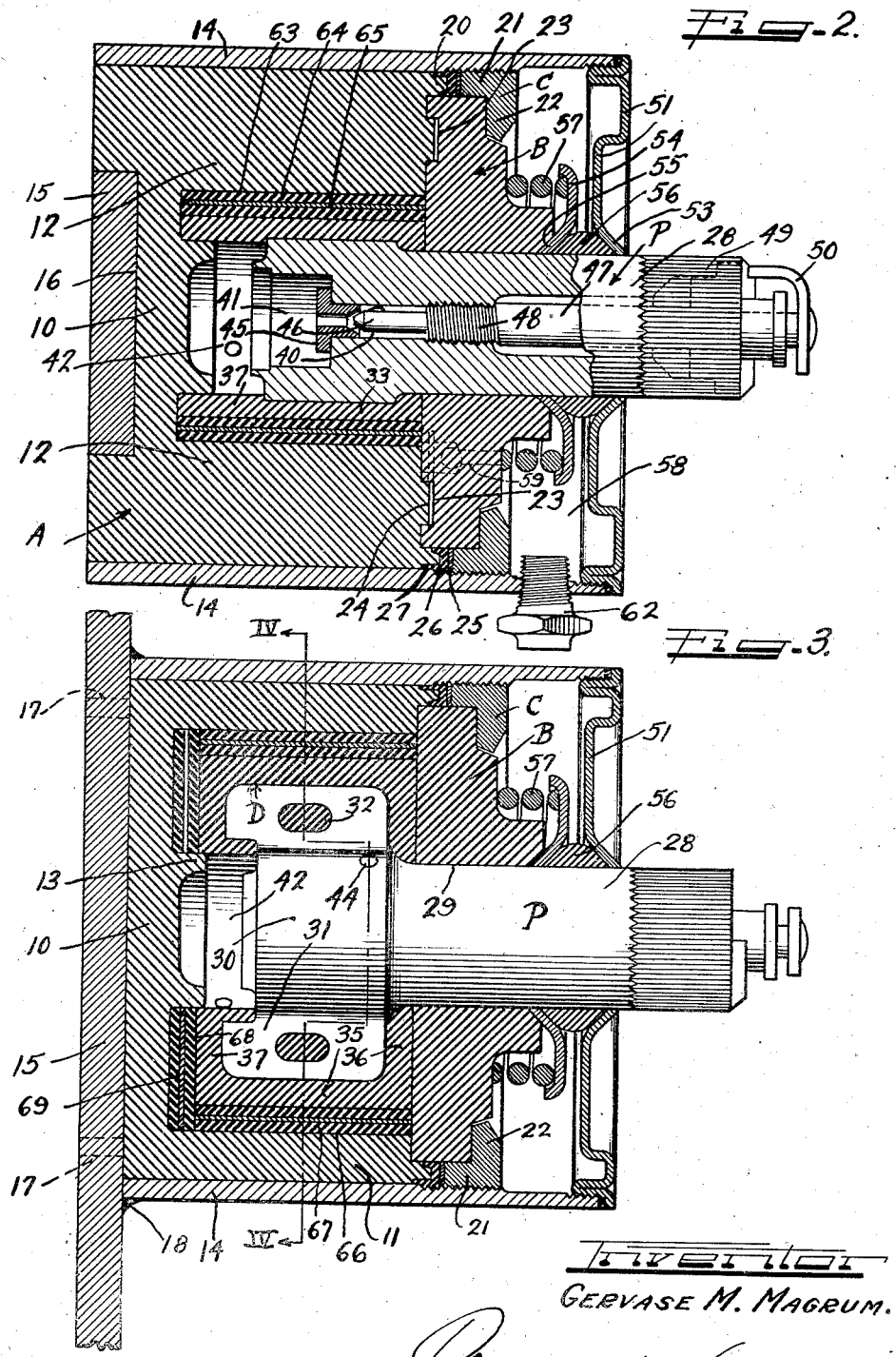

2,409,505

UNITED STATES PATENT OFFICE 2,409,505

HYDRAULIC SHOCK ABSORBER PISTON AND CYLINDER CONSTRUCTION

Gervase M. Magrum, Buffalo, N. Y., assignor to Houdaille-Hershey Corporation, Detroit, Mich., a corporation of Michigan Application September 18, 1944, Serial No. 554,578

18 Claims. (Cl. 309—1)

My invention relates to hydraulic structures, particularly to hydraulic dampers or shock absorbers of the so-called rotary type for use on automotive or other vehicles, airplanes, and other structures for checking, damping and controlling the relative motion between structural parts.

Heretofore hydraulic devices, such as rotary shock absorbers comprising a cylinder structure and a piston structure oscillatable therein, have been constructed entirely of metal, such as steel, and such structures required a large number of intricate, costly machining operations to obtain accurate fit. In some prior art structures of this type non-metallic lining, as of plastic material, was provided in the cylinder structure to eliminate some of the machining operations necessary with metal, but in such structures the lining will loosen during operation of the shock absorber with resulting leakage and corresponding impairment and decrease in the efficiency of operation.

In accordance with my invention, the cylinder structure in a rotary hydraulic device such as a shock absorber is entirely of plastic material, and that part of the piston structure operable within the cylinder structure is exteriorly entirely of plastic material so that during oscillation of the piston structure the contact between the piston structure and the cylinder structure will be entirely between the surfaces of plastic material, there being just enough metal used in the shock absorber assembly to hold the cylinder structure parts together and form reinforcement and protection therefor.

An important feature of my invention resides in a cup-shaped cylinder body with hydraulic abutment wings extending therefrom and formed integral by molding of plastic material, and a piston structure whose inner end is in skeleton form around which is molded plastic material to form the piston hub and vanes extending therefrom, and with channels formed in the abutments and the vanes during the molding operation for receiving sealing bars or strips for maintaining accurate leakproof engagement with the piston hub and the cylinder walls respectively.

A further feature of the invention is a cover or closure wall for the cylinder body formed entirely of plastic material and through which the piston shaft extends for bearing engagement therein.

Another feature of the invention includes the provision of a metal mounting base for the shock absorber secured as by welding to a metal reinforcing shell surrounding the cylinder body, together with various other metal elements for clamping the shaft bearing end wall to the cylinder body and for forming a hydraulic fluid reservoir for replenishing the hydraulic working chambers with hydraulic fluid.

The above referred to and other features of my invention are embodied in the structure shown on the drawings, in which:

Figure 1 is a front end view of the shock absorber with the end or closure wall removed;

Figure 2 is a section on plane II—II of Figure 1;

Figure 3 is a section on plane III—III of Figure 1;

Figure 4 is a diametral section of the hub end of the piston structure taken on line IV—IV of Figure 3; and Figure 5 is an inside elevation of a portion of the end closure wall showing the location of the replenishing flow passageways.

The cylinder body A is an integral structure accurately formed by molding of suitable plastic material. It comprises the base wall 10, and the annular cylindrical wall 11 from which the abutments 12 extend inwardly from diametrally opposite points, a cylindrical bearing boss 13 on the base extending inwardly. The body A is received in a tubular metal shell or sheath 14 for reinforcing and protecting the cylinder body. The metal shell may be expanded by heating and the cylinder body then inserted therein so that when the shell cools it will be tightly clamped around and against the cylinder body. A mounting base plate or metallic bar 15 extends through the diametrally extending channel 16 in the outer side of the base wall 10 and through the recesses 17 in the end of the shell 14, and this bar is preferably secured to the shell as by welding as indicated at 18. This bar thus also functions as a key to hold the cylinder body A in the shell 14 against rotational displacement therein. The ends of the bar extending beyond the shell are provided with bolt holes 19 whereby the shock absorber cylinder structure will be mounted on a support.

The end or closure wall B for the cylinder body A is also entirely of suitable plastic material accurately formed by molding. The end wall abuts the outer end of the cylinder wall 11 and the abutments 12 and is received within the annular cutwardly extending flange or lip 20 on the cylinder wall 11 to be held accurately concentric with the cylinder body A. The end wall is clamped in position by a metal clamping ring C of L-shaped cross-section whose peripheral leg 21 has threaded engagement in the outer end of the shell 14 for engagement of its radially inwardly extending leg 22 against the outer side of the end wall B. In order that the wall B may be held against rotational movement relative to the body part A, the wall is provided on its inner side with circular recesses 23 for receiving the cylindrical bosses 24 formed on the outer ends of the abutments 12. The inner end of the clamping ring leg 21 abuts a metal washer 25 between which and the lip 20 on the body A suitable sealing material 26 is interposed which is compressed when the clamping ring is applied to form a sealing joint, the lip 20 preferably having the annular recess 27 around its outer side forming a spill or overflow space for the packing material.

The piston structure P has the metal shaft 28 which extends outwardly through the bearing opening 29 provided in the end wall B. The inner end of the shaft is of enlarged diameter to form a cylindrical head 30 around which plastic material is to be molded to form the piston structure hub portion and piston vanes. As shown on Figures 3 and 4, the head 30 has wings 31 extending radially outwardly therefrom in diametrically opposite directions and these wings have holes 32 therethrough. The piston metallic structure is inserted into a mold for the molding therearound of suitable plastic material D which will intimately surround the wings 31 and extend through the holes 32 so as to lock the plastic material against axial and rotational displacement on the head 30. The cylindrical annular portion 33 of the plastic casing is of an outer diameter to engage with the cylindrical bearing surfaces 34 at the inner ends of the abutments 12. The portions 35 of the plastic cover surrounding the wings 31 will form the piston vanes which engage with their outer cylindrical surfaces against the inner cylindrical surface of the cylinder body A between the abutments 12, as shown on Figure 1. The outer portion 36 of the plastic material extends radially inwardly to the shaft 28 with its outer face in engagement with the inner face of the end wall B. The inner end portion 37 of the plastic material extends radially inwardly around the inner ends of the wings 31 and then axially inwardly around the inner edges of the wings, the outer face of the portion 37 engaging with the bottom wall 10 of the cylinder body A. Thus, upon oscillation of the piston structure, the only surfaces having bearing engagement with each other will be the surfaces of the plastic material of the cylinder structure and the surfaces of the plastic material on the piston structure, these surfaces being all accurately molded. The inner end portion 37 of the plastic material surrounding the piston structure receives the boss 13 which will provide a bearing support for the inner end of the piston structure.

Referring to Figure 1, the abutments 12 and the piston hub and vanes divide the space within the cylinder body A into hydraulic working chambers 38, 38 and 39, 39. The outer portion of the piston structure shaft 28 has a bore 40 therethrough terminating in the bore 41 which communicates with the space 42 surrounded by the inner end portion 37 of the plastic material on the piston structure. This space is connected with the working chambers 39, 39 through ports 43 formed in the plastic portion 37. The inner end of the shaft bore 40 is connected with the working chambers 38, 38 through ports 44 which extend through the head 30 of the piston structure and the surrounding plastic portion 33, as best shown on Figure 4. Any suitable valve means may be provided for controlling the flow between the working chambers 38, 38 and 39, 39. As shown on Figure 2, a valve seat plug 45 is inserted into the inner end of the bore 40 for engagement by a valve 46 whose stem 47 extends outwardly through the bore 40 to the exterior of the shaft and which stem has threaded connection with the bore 40 as shown at 48, so that when the valve stem is turned the valve 46 will be set relative to the seat plug 42 for determining the resistance to the flow of hydraulic fluid which is displaced in the hydraulic working chambers during oscillation of the piston structure. The outer end of the shaft has a spline formation 49 thereon for receiving a suitable lever. When the shock absorber is applied on an automotive vehicle, the cylinder structure thereof is usually mounted on the vehicle chassis by means of the base plate 15, while the lever on the piston structure shaft is connected through suitable linkage usually with the axle of the vehicle. The valve stem may be provided on its outer end with a suitable arm or lever 50 whereby it may be readily turned for setting of the valve 46.

Referring to Figures 2 and 3, a cover 51, preferably of sheet metal, is provided for the outer end of the shell 14. This cover has threaded engagement in the outer end of the shell, a sealing gasket 52 being provided. The inner portion 53 of the cover receives the shaft 28 and is deflected outwardly. Between the cover and the end wall B an annular abutment plate 54 receives the shaft and has its inner portion 55 deflected inwardly. Between these deflected portions 53 and 55 suitable packing and sealing material 56 surrounds the shaft and is held compressed against the shaft by the force of a spring 57 between the plate and the end wall B.

The outer portion of the shell 14 and the end wall B and the cover 51 define a reservoir space 58 for hydraulic fluid for replenishing the hydraulic working chambers. The replenishing passageways 59 are formed in the end wall B and are controlled by check valves 60 which are confined within the passageways by pins 61. Through these passageways hydraulic fluid will flow from the reservoir 58 into the working chambers to keep these chambers filled with hydraulic fluid at all times A filler plug 62 is provided for the reservoir 58.

In shock absorbers that are subjected to heavy duty, sealing means are preferably provided for preventing leakage. For this purpose channels 63 are formed in the inner ends of the abutments 12 when the cylinder body A is molded. As shown, the channels may be rectangular to receive rectangular bars 64 of suitable sealing material through which cores 65 of metal or other suitable material extend, the sealing material being intimately bonded to the cores. The sealing bars are held intimately against the cylindrical surface of the plastic material portion 33 of the piston structure to prevent leakage between working chambers past the abutments 12.

In the outer ends of the vanes 35, channels 66 are provided for receiving sealing bars 67 for engagement with the inner surface of the wall 11 of the cylinder body A. As shown on Figure 3, the inner end portion 37 of the plastic material on the piston structure may be provided with radial channels 68 for receiving sealing bars 69 which engage against the bottom wall 10 of the cylinder body A. The bar receiving channels are accurately formed during the molding of the plastic material and therefore require no machining.

The plastic material used is preferably of low specific gravity and resistant to heat. The plastic material may be metallic or non-metallic. For example, powdered light metal such as aluminum could be used, or suitable non-metallic plastic such as phenolic resin. The plastic could also have fibrous or cotton filler. When the plastic is accurately molded under heavy pressure, the surfaces thereof will be dense and very smooth so that, with the oil in the shock absorber acting as a lubricant, friction between the sealing bars and the surfaces engaged thereby will be practically eliminated. With the light weight plastic material, and the amount of metal in the shock absorber reduced to a minimum, the weight of the shock absorber will be greatly reduced while retaining maximum strength, and the shock absorber can be manufactured with much less cost and material and labor. With the bearing resistance reduced to a minimum, the life of the shock absorber will be greatly increased.

I have shown and described a practical and efficient embodiment of the various features of my invention but I do not desire to be limited to the exact construction, arrangement and operation shown and described as changes and modifications may readily be made without departing from the scope of the invention as defined in the appended claims.

I claim as my invention:

1. In a hydraulic device of the type described, a cylinder structure formed entirely of molded plastic material, a piston structure whose outer portion is of molded plastic material for bearing engagement with surfaces in said cylinder structure, and metallic protective and supporting means for said cylinder structure.

2. In a hydraulic device for the purpose described, a cylinder structure formed entirely of molded plastic material, a piston structure operable in said cylinder structure, said piston structure being rotatable within said cylinder structure to act upon liquid which may be contained within the cylinder, and a supporting structure for holding said cylinder structure stationary.

3. In a hydraulic damping device, a cylinder structure comprising a cylindrical cup-shaped body molded integral of plastic material, an end wall for said body molded integral of plastic material and having a bearing passageway therethrough, a piston structure comprising a head within said cylinder structure and a shaft extending outwardly through said bearing passageway, said head being surrounded by plastic material intimately molded thereto to present surfaces for cooperation with surfaces in said cylinder structure.

4. In a hydraulic damping device, a cylinder structure comprising a cylindrical cup-shaped body molded integral of plastic material, an end wall for said body molded integral of plastic material and having a bearing passageway therethrough a piston structure comprising a head within said cylinder structure and a shaft extending outwardly through said bearing passageway, said head being surrounded by plastic material intimately molded thereto to present surfaces for cooperation with surfaces in said cylinder structure, and a reinforcing tubular metal shell intimately surrounding said cylinder structure.

5. In a hydraulic damping device, a cylinder structure comprising a cup-shaped body part in the form of an integral molding of plastic material with abutments extending radially therefrom, an end wall for said body in the form of an integral molding of plastic material and having a bearing passageway therethrough, a piston structure comprising a head within the cylinder structure and a shaft extending through and having bearing support in said bearing passageway, said head being surrounded by plastic material intimately molded thereto and defining a cylindrical hub portion for bearing engagement with said abutments and radially extending vanes for bearing engagement with the cylinder surface of said cylinder structure between said abutments.

6. In a hydraulic damping device of the type disclosed, a cylinder structure, a piston structure having a head within the cylinder structure and a shaft extending outwardly therefrom, said head having wings extending therefrom, and plastic material intimately molded around said head and wings to provide surfaces for engagement with surfaces of said cylinder structure.

7. In a hydraulic damping device, a cylinder structure enclosing a cylinder space and having abutments extending into said space, a piston structure comprising a metallic shaft terminating in a head in said cylinder space having radial projections thereon, plastic material intimately molded around said head and said projections to form a hub portion for engagement with said abutments and vanes for engagement with said cylinder structure between said abutments.

8. In a rotary hydraulic shock absorber, a cylinder structure of plastic material, a tubular metal shell intimately receiving said cylinder structure, said cylinder structure having a diametrically extending channel in its end, and a metal base bar extending through said channel and welded to said metal shell whereby to hold said cylinder structure against rotary displacement in said shell.

9. In a rotary hydraulic damper, a cylinder structure and a piston structure oscillatable therein, said cylinder structure being of plastic material, a reinforcing tubular metal shell intimately receiving said cylinder structure, said cylinder structure having a diametral channel in its end and the end of said shell having recesses in alignment with said channel, and a metal supporting bar extending through said channel and recesses and being welded to said shell whereby to hold said cylinder structure against rotatable displacement in said shell.

10. In a rotary shock absorber of the type described, a vaned piston structure comprising a metal shaft terminating in a head having projections thereon, and plastic material intimately molded around the head and projections to form a cylindrical hub portion with vanes extending therefrom.

11. In a rotary hydraulic shock absorber construction, a cylinder structure of plastic material, a tubular metal shell intimately receiving said cylinder structure, said cylinder structure having a diametrically extending channel in its end, and a keying member within said channel and cooperating with said metal shell and said cylinder structure whereby to hold said cylinder structure against rotary displacement in said shell.

12. In combination in a cylinder structure for a rotary hydraulic shock absorber, said cylinder structure being formed of plastic material, a reinforcing and supporting structure including means for securing the cylinder in place on a structure with which the shock absorber is to be used, said cylinder structure and said reinforcing and supporting structure being keyed together against relative rotary displacement.

13. In combination in a hydraulic shock absorber construction, a cylinder formed of plastic material and being of generally cup shape, a rotatable piston co-operable within said cylinder and having a stem projecting substantially beyond the open end of the cylinder, a plastic closure cap over the open end of the cylinder and having a bearing opening therethrough co-operating with said piston stem, and means engaging and clamping said cap onto said end of the cylinder.

14. In combination in a hydraulic shock absorber construction, a cylinder structure comprising a cylindrical cup-shaped body molded of plastic material, a piston structure comprising a head within said cylinder structure and a shaft extending outwardly beyond the open end of the cylinder cup, a closure cap for the cylinder formed of plastic material and having a bearing passageway therethrough for said shaft, a reinforcing tubular metal shell intimately surrounding said cylinder structure and projecting beyond the cap-closed end thereof, and a clamping ring threaded into the projecting portion of the metal shell and engaging said cap to secure the latter in place on the end of the cylinder structure.

15. In combination in a hydraulic shock absorber construction, a cylinder structure comprising a cylindrical cup-shaped body molded of plastic material, a piston structure comprising a head within said cylinder structure and a shaft extending outwardly beyond the open end of the cylinder cup, a closure cap for the cylinder formed of plastic material and having a bearing passageway therethrough for said shaft, a reinforcing tubular metal shell intimately surrounding said cylinder structure and projecting beyond the cap-closed end thereof, a clamping ring threaded into the projecting portion of the metal shell and engaging said cap to secure the latter in place on the end of the cylinder structure, said cap being of smaller diameter than the interior diameter of said shell, and liquid sealing means within the space provided between the periphery of the cap and the opposing wall of the metal shell, said clamping ring being constructed and arranged to drive said sealing means toward the end portion of the cylinder exposed within said space and into sealing engagement with the contiguous wall surfaces of the cap and metal shell at said exposed end portion.

16. In combination in a hydraulic shock absorber construction, a cylinder structure comprising a cup-shaped molded plastic body, a rotary piston structure within said cylinder structure and having a shaft projecting therefrom, a closure member of molded plastic material for the open end of the cylinder structure and having a bearing passage therethrough for the piston shaft, interengaging means on said cylinder structure and said closure member holding them against relative rotation, and means for securing the cylinder structure and closure member together.

17. In combination in a hydraulic shock absorber construction, a cylinder structure comprising a cylindrical cup-shaped body molded of plastic material, a reinforcing tubular metal shell intimately surrounding said cylinder structure and projecting substantially beyond the open end of the cylinder structure, a plastic closure cap for said open end of the cylinder structure co-operating with the metal shell for securing the cap in place, a closure cap for the projecting end of the metal shell and spaced from said cylinder closure cap to provide a substantial liquid chamber between the two caps, said plastic cap having means affording communication between said chamber and the interior of the cylinder, and a rotary piston within said cylinder held in place by said plastic cap and having a shaft projecting out through both of the caps.

18. In combination in a hydraulic shock absorber construction, a cylinder structure having an end wall, a rotary piston within the cylinder and comprising a metallic head spaced at its inner end from said end wall and surrounded by plastic material intimately molded thereto and defining a cylindrical hub portion for bearing engagement with the cylinder wall, said hub portion having the inner end thereof projecting beyond the inner end of the metallic head to engage said end wall and defining a fluid chamber between the inner end of said head and the end wall.

GERVASE M. MAGRUM.